Patented Dec. 29, 1925.

1,567,747

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY SEPARATOR.

No Drawing.  Application filed November 1, 1923. Serial No. 672,158.

*To all whom it may concern:*

Be it known that I, PAUL E. NORRIS, a citizen of the United States, residing at Wilkinsburg, in the county of Allegheny and State of Pennsylvania, have invented certain new and useful Improvements in Storage-Battery Separators, of which the following is a specification.

My invention relates to storage battery separators.

I will describe one form of storage battery separator embodying my invention and will then point out the novel features thereof in claims.

I propose to make a storage battery separator by treating an acid resisting porous material with rubber latex. The resulting mass may then be shaped, by the application of pressure, or by any other suitable means, to the desired form. The porous material may be wood pulp, wood flour, ground cork or any other suitable material.

I have discovered that rubber latex, that is, uncured rubber sap, is particularly suitable for use in a storage battery separator because this material is acid resisting, is highly viscous, and has the peculiar property of adhering to the individual particles of the porous material without penetrating the pores of the material.

I do not wish to limit myself to any particular porous material or any particular method of forming the separator.

Although I have herein described only one form of storage battery separator embodying my invention, it is understood that various changes and modifications may be made therein within the scope of the appended claims without departing from the spirit and scope of my invention.

Having thus described my invention, what I claim is:

1. A storage battery separator comprising rubber latex.

2. A storage battery separator comprising rubber latex and a porous material.

3. A storage battery separator comprising rubber latex and wood.

4. A storage battery separator comprising rubber latex and finely divided porous material.

In testimony whereof I affix my signature.

PAUL E. NORRIS.